C. C. RICH.
FRICTIONAL LOCKING HYDRAULIC CLUTCH.
APPLICATION FILED MAR. 3, 1913.
1,136,168.  Patented Apr. 20, 1915.
3 SHEETS—SHEET 2.
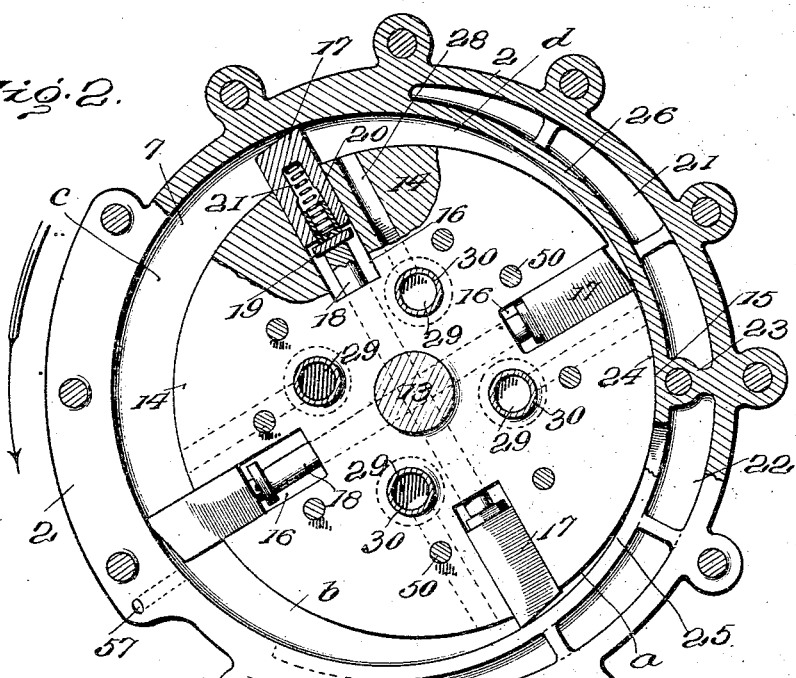
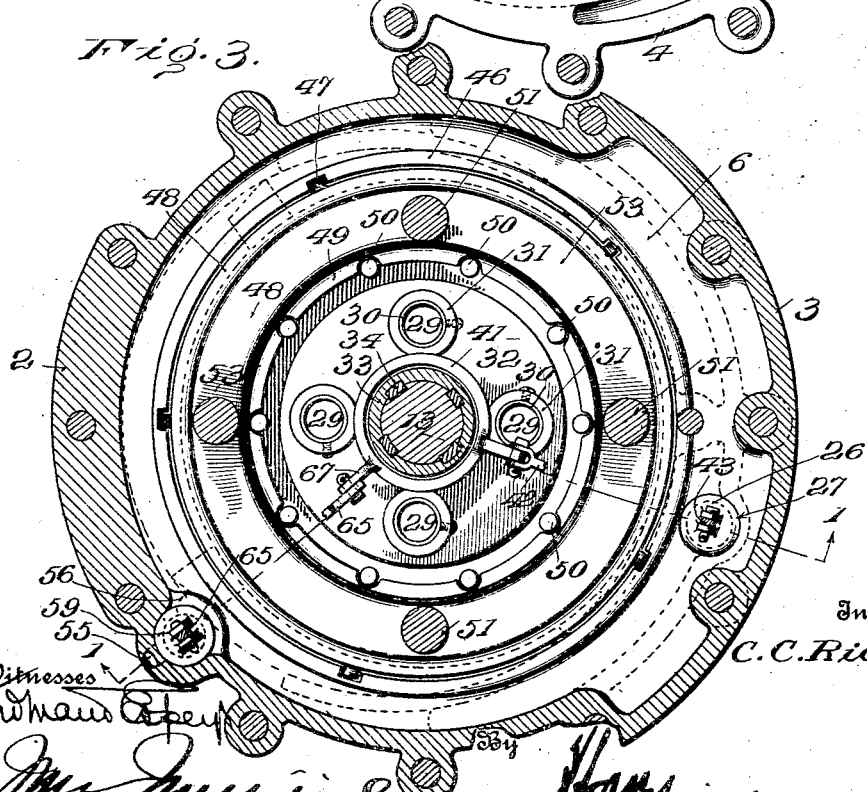

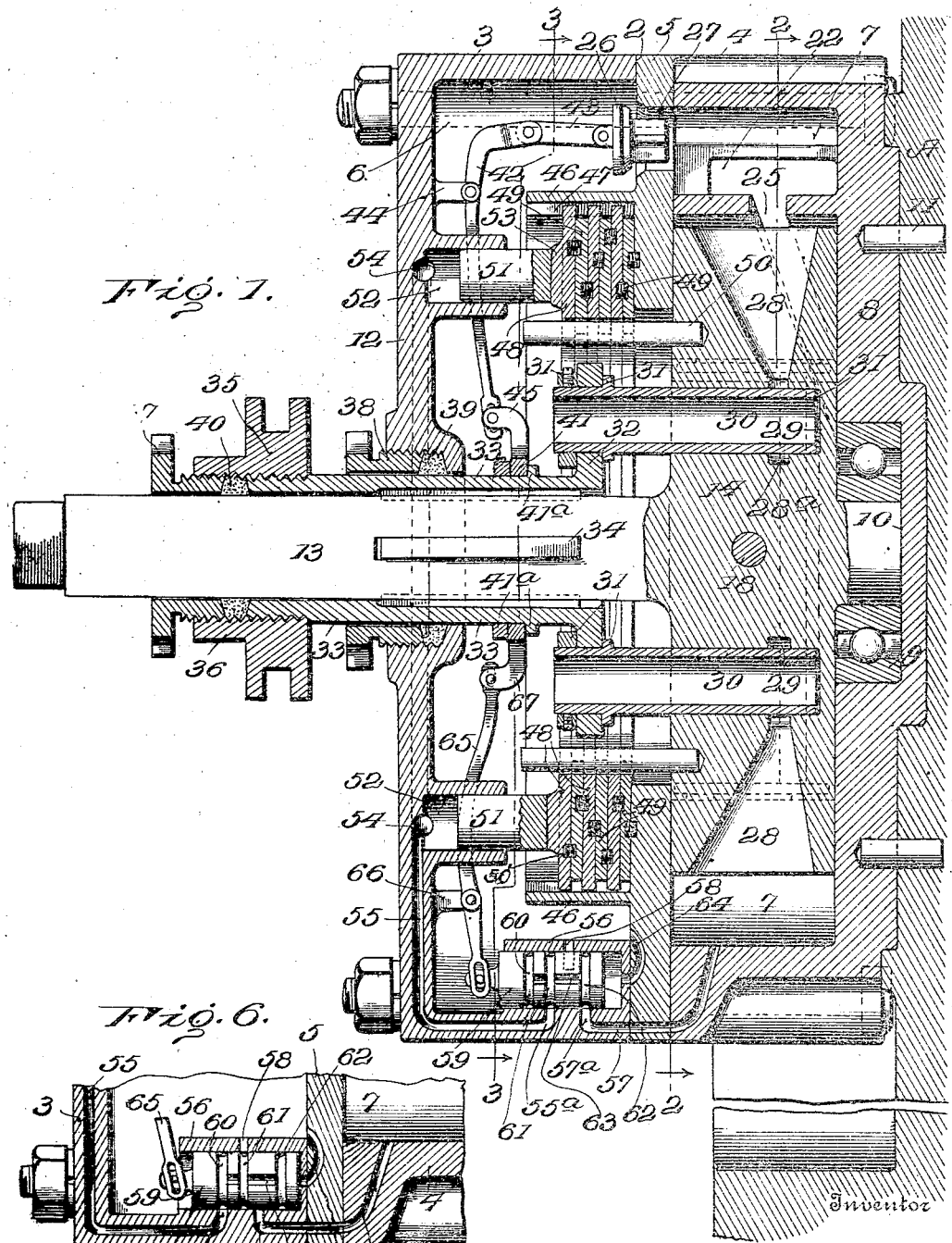

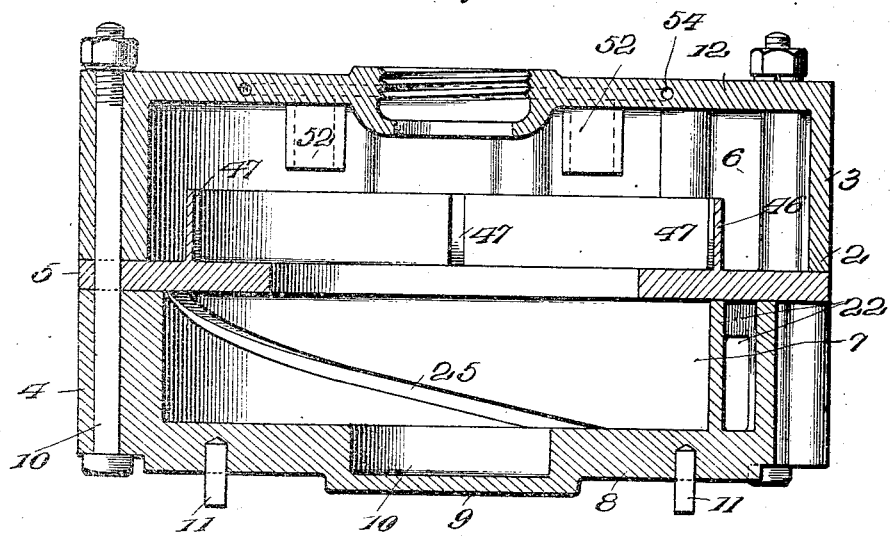

UNITED STATES PATENT OFFICE.

CHARLES CLAYTON RICH, OF MOUNT VERNON, NEW YORK.

FRICTIONAL LOCKING HYDRAULIC CLUTCH.

1,136,168.            Specification of Letters Patent.          Patented Apr. 20, 1915.

Application filed March 3, 1913. Serial No. 751,798.

*To all whom it may concern:*

Be it known that I, CHARLES C. RICH, citizen of the United States, residing at Mount Vernon, in the county of Westchester and State of New York, have invented certain new and useful Improvements in Frictional Locking Hydraulic Clutches, of which the following is a specification.

My invention relates to clutches and particularly to hydraulic clutches, that is, clutches wherein a fluid medium is used as a means of connecting a driving element with a driven element.

The object of my present invention is the provision of a clutch of this character wherein the driving and driven elements may not only be hydraulically connected, but wherein they may be frictionally connected to secure a practically positive driving engagement between the driven and driving elements of the clutch.

A further object of my invention is to provide a clutch which shall include means for compressing a fluid medium into the space between the driving and the driven elements and which shall also include a plurality of friction disks, certain of the disks being connected to the driven element and certain of the disks to the driving element, these disks being normally held apart, and include hydraulically operated devices for forcing the friction disks into engagement with each other to thereby positively connect the driven element with the driving element.

A further object of the invention is to provide means whereby a fluid medium shall first be compressed between the driving and the driven elements of the clutch and that the pressure of this fluid medium shall act to force the friction disks into engagement with each other.

A still further object is to provide in a clutch of the character last stated, a plurality of pistons disposed behind and in operative engagement with the friction disks to provide a duct leading from the fluid compression space of the hydraulic portion of the clutch to the space behind the pistons, and to provide a valve so connected to the clutch actuating mechanism that after the driven element of the clutch has been hydraulically connected to the driving element thereof, the compressed fluid will pass into the space behind said pistons to thereby positively connect the two elements and whereby the first movement of the actuating element in unclutching will be to shift this valve to thereby relieve the fluid pressure behind the pistons of the friction disk and then successively relieve pressure on the compression side of the hydraulic clutch.

Other objects will appear in the course of the following description.

For a full understanding of my invention, reference is to be had to the following description and accompanying drawings.

In the drawings: Figure 1 is a diametrical section on the line 1—1 of Fig. 3 of a clutch constructed in accordance with my invention; Fig. 2 is a section on the line 2—2 of Fig. 1; Fig. 3 is a section on the line 3—3 of Fig. 1; Fig. 4 is a diametrical section through the casing or driving element of the clutch, the interior mechanism, however, being removed; Fig. 5 is a perspective view of the rotor and its blades, one of its blades being removed from its pocket; Fig. 6 is a fragmentary section of the lower portion of the fluid chamber shown in Fig. 1, but showing a valve 59 shifted into position to relieve the pressure behind the disk actuating pistons.

Referring to these drawings, and more particularly referring to Fig. 1, it will be seen that the driving element of my clutch comprises a casing, designated generally 2, this casing being formed of three sections 3, 4 and 5, the sections 3 and 4 forming end heads abutting against the section 5, and the section 5 forming annular partition or septum dividing the outer casing into two chambers 6 and 7.

The section 4 being closed at its end provides a head 8, this head being formed at its center with a projecting hub or boss 9 and with a recess 10 upon the inner face of the head. The boss 9 projects into a central recess formed in a fly wheel A and the casing is held in rotative engagement with the fly wheel by means of a plurality of pins 11 and by stud bolts operatively engaging the casing and the fly wheel. The fly wheel A is of any ordinary construction, but is shown as formed like those fly wheels that are adapted for attachment to ordinary frictional clutches commonly used upon automobiles.

The section 3 of the outer casing or driving element is formed with a head 12 closing the end of the casing opposite the head 8, this head 12 being annular and formed with a central opening for the passage of an actuating sleeve, which will be later described, and a driven shaft 13. The partition 5 is also formed with a central opening for the passage of this shaft 13, and the inner end of this shaft is connected in any suitable or ordinary manner with a rotor 14.

By reference to Fig. 2, it will be seen that the rotor 14 and the driving element or outer casing 2 have the same axis of rotation, but that the interior face of the rotor chamber 7 is eccentric to the axis of the driven shaft and rotor. It will be also seen from this figure that the periphery of the rotor contacts at one point, designated 15, with the inner face of the rotor chamber 7, and upon reference to Fig. 1 it will be noted that the sides of the rotor fit closely to the sides of the rotor chamber.

While the rotor may be of any construction to accomplish the end desired, I have illustrated it as formed with four radially extending recesses or pockets 16. These pockets are open at their ends, and within the pockets are disposed the blades 17 which have a width substantially equal to the width of the rotor chamber 7 and are forced out against the inner face of the rotor chamber, the outer end faces of the blades being beveled. The blades 17 are forced outward primarily by means of rods 18 which bear against plate 19 and springs 20 which are disposed within sockets 21 formed in the blades.

It will be obvious from Fig. 2 that as the outer casing rotates with relation to the rotor, the blades will be reciprocated, and that as one blade moves inward the blade connected therewith will be moved outward by the movement of the rod 18. The springs 20 act to resiliently urge the blades 17 outward against the inner face of the rotor chamber. I do not wish to be limited to the construction described for the blades, as this may be modified in many ways and forms no part of my present invention.

That portion of the wall of the rotor chamber which is nearest to the axis of rotation of the rotor is formed with an inlet chamber, designated 22. This chamber 22 is disposed on one side of the point of contact of the rotor with the outer casing. Assuming that the outer casing 2 is rotating in the direction of the arrow, Fig. 2, and assuming that the chamber 22 is connected to a source of fluid, then, as the outer casing rotates in the direction of the arrow, the chambers or spaces defined by the outer face of the rotor, the inner face of the casing, and the blades 17 will change their shape. Thus, the spaces on the inlet side of the clutch will gradually become larger, while the spaces on the outlet side will become smaller. As the spaces on the inlet side, which spaces are designated $a$ and $b$ in Fig. 2, become larger, they will act to suck in fluid medium, while the spaces $c$ and $d$ will act to eject the fluid medium, and if no opening is provided through which this fluid medium may be ejected, then the fluid medium will become choked within the spaces $c$ and $d$ and will bind the outer driving element to the inner or driven element, namely, the rotor 14 and the shaft 13. The wall of the chamber 22 is formed with a longitudinally extending port 25 which communicates with the interior of the rotor chamber. This port 25 is preferably arranged diagonally to the axis of rotation of the rotor, as shown in Fig. 4, so that as the port 25 sweeps across the faces of the blades 17, it will traverse the entire face of each blade, thus equalizing wear. The wall of the chamber 22 provided by the partition 5 is formed with an inlet port 27 (see Fig. 1) which opens into the chamber 6. Thus, when the fluid medium is being sucked into the spaces $a$ and $b$, the fluid medium will be drawn in from the chamber 6 into the chamber 22, and thence by the port 25 into the spaces $a$ and $b$. The port 27 is controlled by means of a valve 26 connected to the operative mechanism of the rotor, as will be later stated.

Disposed in advance of each of the blades 17 and extending into the body of the rotor is a port or passage 28. Each of these ports or passages 28 at its inner end communicates with a passage 29. In each of these passages is disposed a sleeve valve 30 which fits the wall of the passage 29 snugly but is movable outwardly therein. The inner end of each passage 28 is annularly enlarged as at 28ª to surround the passage 29 and open thereinto. Each of the valves 30 is extended outward and formed with spaced outwardly projecting flanges 31, the ends of the valves 30 projecting through a head 32 formed upon a sleeve 33 which surrounds the driven shaft 13. This sleeve 33 rotates with the driven shaft but is longitudinally movable with reference thereto. It is held in engagement with the driven shaft by means of splines or feathers 34. The flanges 31 engage the inner and outer faces of the head 32 so that as the sleeve 33 is shifted, the valves will be shifted either inward or outward. When the valves 30 are shifted outward, they will uncover the ports 28ª of the passages 28 and permit the escape of fluid from the compression side of the clutch into the chamber 6. When the valves 30 are shifted inward they will close the escape from the passages 28.

The sleeve 33 may be shifted inward and outward by any suitable mechanism, but I have shown the outer end of the sleeve as is screw-threaded, and this screw-threaded terminal is engaged by a shipper ring 35. This shipper ring 35 has an annular extension 36 which has screw-threaded engagement with a gland 37 sliding upon the driven shaft. The sleeve 33 passes through the central opening of the head 12 and through a gland 38, which is mounted within the head 12, packing 39 and 40 being disposed between the gland 38 and head and between the gland 37 and the extremity of the sleeve 33.

Surrounding the sleeve 33 within the chamber 6 is a ring 41 within which the sleeve 33 is rotatable. This ring is held from longitudinal movement independent of the sleeve by opposed flanges 41$^a$ formed on the sleeve, and the ring 41 is provided with outwardly projecting brackets having pins pivotally engaging the valve actuating levers.

The valve 26 is operatively connected with the sleeve 33 by means of a lever 42 pivoted to a link 43 which in turn is pivoted to the valve 26. This lever 42 is pivoted upon a bracket 44 projecting inward from the head 12, the other end of this lever being slotted and pivoted to the bracket 45 of the ring 41. It will thus be seen that when the sleeve 33 is moved outward so as to shift the valves 30 to their relief position, the valve 26 will be closed, and that when the valves 30 move inward the valve 26 will be raised. There is, of course, a neutral position wherein the valve 26 is slightly open and the valves 30 also slightly open.

In order to provide means for positively and mechanically engaging the driven element with the driving element, I provide a series of friction rings which are normally spaced from each other but which are brought into engagement with each other after the hydraulic clutch is operated. To this end, the partition 5 is formed with an outwardly projecting annular flange 46, this flange being formed with notches 47. Disposed inward of this flange 46 are a plurality of frictional rings or annular disks, one series being designated 48 and the other 49. The annular disks 48 are provided with projecting teeth which engage in the notches 47 so that the friction disks 48 will revolve with the driving element. The alternate friction disks 49 are notched upon their inner edges and these notches are engaged by pins 50 which extend through the central opening of the partition 5 and into the rotor so that these friction disks 49 will rotate with the rotor.

Any means such as springs 50' may be used to force the friction disks apart when pressure against them is relieved. When the friction disks are apart, they will, of course, rotate independent of each other, but when they are forced together into frictional contact, both sets of the friction disks will bind against each other and the driving and driven elements will rotate together. For the purpose of forcing these disks into frictional contact, I provide a plurality of pistons 51. These pistons are mounted each in a cylinder 52 formed in the head 12. The outer ends of the pistons 51 contact with an annular thickened portion 53 formed upon the outermost ring 48.

Extending annularly through the head 12 is a duct 54 which communicates with the cylinders 52. This duct also communicates by means of an extension 55 with a valve chamber 56. This valve chamber in turn communicates by means of a duct 57 with the compression space formed between the outer casing and the rotor on the compression side of the rotor. The valve casing 56 is cylindrical in form, and the ducts 55 and 57 open into one side of it by ports 55$^a$ and 57$^a$. The opposite side of the wall of the valve chamber is formed with a port 58 which opens into the chamber 6.

Disposed within the valve chamber 56 is a cylindrical piston valve 59 shown also in Fig. 6. This valve 59 has a circumferential groove 60 formed in its face, a circumferential groove 61 parallel with the groove 60 and a circumferential groove 62, the grooves 61 and 60 being spaced from each other a distance equal to the distance between the planes of the port 55$^a$ and the port 58. The groove 61 is spaced from the groove 62 a distance equal to the distance between the plane of port 55$^a$ and the plane of port 57$^a$.

When the valve is in the position shown in Fig. 1, the grooves 61 and 62 will be respectively opposite the ports 55$^a$ and 57$^a$, and these ports will be operatively connected by means of a longitudinal groove 63 which intersects the grooves 60, 61 and 62. In this position of the valve, the groove 60 will be blanked by contact with the imperforate wall of the valve chamber. When the valve is shifted inward, the groove 60 will register with the port 55$^a$ and the groove 61 will register with the port 58. Communication will thereby be established between the duct 55 and the interior of the chamber 56 and between the latter and the chamber 6. A relief port 64 is also provided in the lower end of the valve chamber 56 and opening into the chamber 6 for the purpose of preventing compression between the end of the valve and the end of the chamber and permitting the valve to move freely.

The valve 59 is operatively connected to the sleeve 33 by means of a lever 65 which is pivoted upon a bracket 66 projecting from the head 12, the inner end of this lever 65 being pivoted to a bracket 67 projecting from the ring 41.

The operation of my invention is as follows: The fluid medium used within the clutch is preferably oil, which is introduced into the chamber 6 in any convenient or preferred manner. When the clutch is at rest and the relief ports are open, this fluid medium will collect in the lower portion of the chamber 6 below the sleeve 33. When the driving element 2 is rotated, the oil will still remain in the outermost portion of the case by reason of the centrifugal action so that it may conveniently enter the port 27 into the induction side of the clutch. When it is desired to connect the driven member (namely the rotor 14 and the shaft 13) to the driving member, the sleeve 33 is shifted inward. In the neutral position with the valve 26 and the valves 30 partly open the oil will flow through the port 27 into the chamber 22 and then escape through passages 28 and 29 and valve 30 back into the chamber 6 so that little or no motion will be imparted to the rotor. As the sleeve is shifted inward, it begins to open the valve 26 and close the valves 30. The fluid medium is then allowed to be sucked into the inlet side of the clutch but as the relief ports 28 are partially closed, this fluid medium has difficu' in escaping and commences to bind o. be impounded between the rotor and the casing and as a consequence the rotor will rotate with the driving element but at a less speed than the driving element. As the relief valves are moved more and more to their closed position, this binding action becomes greater and the driven element or rotor will pick up speed. When the relief valves 30 are fully closed, the fluid medium will become "wedged" between the rotor and the driving element on the compression side of the clutch and will hydraulically connect the driving and the driven elements. As the sleeve 33 is moved inward, it will act upon the lever 65 to cause the outward movement of the valve 59 and eventually the ports 61 and 62 of this valve are brought into the position shown in Fig. 1. At this point the ducts 55 and 57 are connected and as a consequence the fluid compressed in the chambers c and d will flow out and into the piston chambers 52, forcing out the pistons 51 which in turn will force the friction disks 48 and 49 into frictional engagement with each other. When this has been fully attained the driving element is mechanically connected with the driven element. When it is desired to unlatch the driving and the driven elements, the reverse movement takes place. The sleeve 33 is moved outward. This acts first to shift the valve 59 so as to bring the groove 60 into coincidence with the port 55ª and the groove 61 into coincidence with the port 58. As a consequence, pressure behind the pistons 51 is released and the pistons are free to move backward and the friction elements 48 and 49 to separate. A further movement of the sleeve 33 gradually withdraws the valves 30 and gradually opens the inner ends of the ports 28, thus gradually relieving the compressed fluid medium within the chambers c and d. As soon as this compression is fully relieved, the driving element will rotate independently of the driven element and the fluid medium will be carried out through the passages 29 into the chamber 6. At this time the valve 26 will be closed preventing the entrance of fluid medium into the suction side of the clutch and air will take the place of the oil, thus permitting the driving element to run entirely free of the driven element and relieving any compression. A slight amount of oil will splash into the openings of the passages 29 and will find its way by ports 28 into the interior of the rotor casing, thus lubricating the blades therein.

It will be noted the fulcrums of the levers 42 and 65 are nearer the outer ends than the inner ends of the same so that the inner portions of the arms of the levers will have a greater throw than their outer arms. This arrangement so times the operation of the valves 30 and 59 that the friction disks will not be moved into engagement until after the rotor is moving at full speed, and, in unclutching, the pressure between the rotor and the casing will not be relieved until after the pressure upon the friction disks has been relieved.

While I have illustrated what I believe to be the best form of my invention, I do not wish to be limited thereto as it is obvious that many changes might be made in the details of construction without departing from the spirit of the invention.

While I have described the frictional locking elements 48 and 49 as in the form of annular disks, it is to be understood that the shape of these elements may be varied within a wide range without departing from the spirit of the invention, and that I do not wish to be limited to this particular manner of frictionally engaging the driving element with the driven element as any other means for this purpose may be used. Frictional pressure may be secured by means of pistons forced outward by the pressure of fluid within the compression space of the clutch. In the form illustrated, the variations in speed are secured by varying the pressure of the fluid medium within the compresssion space of the clutch, and the friction disks are not designed, as illustrated, to be used for the purpose of securing variations in speed, the disks being forced into contact with each other almost instantaneously so as to secure a mechanical drive in addition to the hydraulic engagement between the driving and the driven elements. In some instances, however, it may be desirable to use the friction elements as they are ordinarily used, that is, to permit the driving element to rotate at a different speed from the driven element, the friction elements under these circumstances shifting with relation to each other.

In the construction illustrated, the number and area of the friction locking elements 48 and 49 may be small because of the great pressure available, and the fact that the clutching elements are rotating at substantially the same speed at the time of application of pressure, tending to force the friction elements into operative engagement. It will be seen, therefore, that as illustrated, these friction elements form the means for mechanically connecting the driving element to the driven element after the driven element is in motion. The reason for using friction elements in place of teeth upon the driving and driven elements, for instance, which would positively engage with each other, is that where the clutch is to be used upon heavy trucks or in like situations, a certain slippage between the friction elements is of advantage as preventing sudden shock or too great a strain being suddenly applied to the driven element.

While throughout the specification I have referred to a compression of the fluid medium, and to a space within which the fluid is compressed, yet the term "compression" is not strictly accurate. The oil used as the fluid medium is not compressible in itself but is simply subjected to high pressure which pressure is transmitted to the driving and the driven elements. It has been found, however, much more convenient to refer to pressure being exerted upon the fluid medium as a compression of the fluid medium, and furthermore this is substantially correct for the reason that in the churning up of the fluid medium due to the rotation of the clutch, numerous bubbles of air or gas will find their way into the oil and when the oil is subjected to extreme pressure, the gas contained within these bubbles will be reduced in volume and thus the total volume of the fluid medium will be reduced and in this sense the fluid medium will be compressed.

Having thus described my invention, what I claim as new and desire to secure by Letters Patent is:

1. In a hydraulic clutch, a driving element and a driven element, means for hydraulically engaging the driving with the driven element, means for frictionally engaging the driving with the driven element, and means for securing said frictional engagement after complete hydraulic engagement has been secured.

2. In a hydraulic clutch, a driving element, a driven element, a plurality of frictionally contacting elements, certain of which are operatively connected with the driving element of the clutch, and certain others of which are operatively connected with the driven element of the clutch, means for hydraulically engaging the driving element with the driven element, and means actuated by said means for engaging the frictional members with each other.

3. In a hydraulic clutch, a driving element, a driven element, means for compressing fluid between the driving and driven elements to operatively engage them for movement in one direction, a plurality of friction elements, certain of the elements being engaged with the driving element and certain others of the friction elements being engaged with the driven element, and means operated by the fluid compressing means for forcing the friction elements into frictional engagement with each other to thereby engage the driving element with the driven element.

4. In a hydraulic clutch, a driving element, a driven element, means for admitting fluid between the driving and driven elements, means for compressing the fluid in the space between the driving and driven elements, means for relieving the pressure of the fluid between the driving and driven elements, a plurality of frictionally contacting elements normally held out of frictional engagement with each other, and some of said elements being connected with the driving element and other of said elements connected with the driven element, means actuated by the compression of the fluid between the driving and driven elements forcing said frictional elements into operative contact with each other.

5. In a hydraulic clutch, a driving element, a driven element, means for admitting fluid between the driving and driven elements, means for compressing fluid between said elements to thereby operatively engage the elements to each other for coincident movement, means for relieving the pressure of fluid between the driving and driven elements, a plurality of friction disks, certain of the disks being operatively connected to the driving element and certain other disks being operatively connected to the driven element, means actuated by the compression of fluid between the driving and driven elements acting to force said disks into frictional engagement with each other, and means for relieving frictional engagement between said disks when said compression is relieved.

6. In a hydraulic clutch, a driving element and a driven element, means for admitting fluid into the space between the driving and driven elements, means for compressing said fluid, a plurality of friction disks normally disengaged from each other, certain of the disks being operatively connected to the driven element and certain other disks being operatively connected to the driving element, means for transmitting the pressure of the fluid compressed between the driven and driving elements to said disks to cause their frictional engagement, means for relieving the pressure of fluid behind said disks to thereby release frictional engagement between the disks, and means for relieving the compression of fluid between the driving and driven elements.

7. In a hydraulic clutch, a driving element, a driven element, means for admitting fluid between the driving and driven elements, means for compressing fluid between the driving and driven elements to thereby operatively engage said elements for coincident movement, a plurality of friction disks, certain of the disks being connected to the driven element and certain of the disks being connected to the driving element, means controlled by the pressure of fluid between the driving and driven elements for forcing said disks into frictional engagement with each other, a relief valve controlling discharge from the space between the driving and the driven elements, and a valve controlling the transmission of pressure from said space to said friction disks.

8. In a hydraulic clutch, a driving and a driven element, one of said elements embodying a hollow casing and the other embodying a rotor disposed within the casing, a plurality of friction disks mounted within the casing, certain of the disks being connected to the driving element and certain other disks being connected to the driven element, means for admitting a fluid medium into the space between the rotor and outer casing, means carried by the rotor for compressing said fluid medium between the rotor and casing to thereby lock the driving and driven elements to each other for coincident movement, a relief valve controlling the discharge of compressed fluid medium from within said space, means for transmitting the pressure of said fluid medium when compressed to said friction disks to cause their frictional engagement, a valve controlling said transmission of pressure, and operative connections between the first-named valve and the last-named valve whereby the second-named valve shall operate successively to the first-mentioned valve upon a movement of the first-named valve to prevent the discharge of fluid medium from the casing, and whereby the first-named valve shall operate successively to the second-named valve upon the relief of fluid pressure behind said friction disks.

9. In a hydraulic clutch, a driving element and a driven element, one embodying an outer casing and the other a rotor disposed within the casing, the outer casing and the rotor having a common axis of rotation, the inner face of the casing being eccentric to the face of the rotor and touching the rotor at one point, said rotor being formed with blade pockets and with passages communicating with the space between the rotor and the casing and extending inward from a point in advance of each blade pocket and then outward to the outer face of the rotor, shiftable blades mounted in the blade pockets, shiftable valves mounted in said passages, means for permitting the entrance of fluid medium into the space between the rotor and outer casing, and means for shifting said valves to close or open the passages leading from the spaces defined by the blades, the rotor and the casing.

10. In a hydraulic clutch, a driving element and a driven element, one embodying an outer casing and the other a rotor disposed within the casing, the outer casing and the rotor having a common axis of rotation, the inner face of the casing being eccentric to the face of the rotor and the rotor touching the same at one point, said rotor being formed with blade pockets and with passages communicating with the space between the rotor and the casing and extending inward from a point in advance of each blade pocket and then outward to the outer face of the rotor, shiftable blades mounted in the blade pockets, shiftable tubular valves open at both ends and mounted in said passages, means for permitting the entrance of fluid medium into the space between the rotor and outer casing, and means for shifting said valves to close or open the passages leading from the spaces defined by the blades, the rotor, and the casing.

11. A hydraulic clutch including a driving element embodying an outer hollow casing divided into two sections and a partition parallel to the end walls of the casing, the middle of the partition being open, said partition dividing the casing into two chambers, a rotor chamber and a fluid chamber, a rotor mounted within the rotor chamber and having a shaft projecting through the fluid chamber, the rotor and outer casing having a common axis of rotation but the inner face of the rotor chamber being eccentric to said axis and the rotor contacting at one point with the inner face of the chamber to thereby form a compression space on one side of said point of contact and an inlet space on the other side thereof, yielding blades mounted upon the rotor and contacting with the inner face of the rotor chamber, valve controlled means for admitting fluid from the fluid chamber into the rotor chamber on the inlet side thereof, valve controlled means for relieving pressure between the rotor and the casing on the compression side of the clutch, a plurality of friction disks mounted in the fluid chamber and normally separated from each other, certain of the disks being operatively connected to the outer casing and certain other disks being operatively connected to the rotor, valve controlled means for transmitting fluid pressure from the space between the rotor and the casing on the compression side of the clutch to said friction disks, means operatively connecting the several valves for common actuation, and shiftable means for actuating said valves.

12. In a hydraulic clutch, an outer casing constituting a driving element and having a partition dividing the casing into two chambers, one of the chambers constituting a rotor chamber and the other a fluid chamber, a rotor in the rotor chamber, the rotor and casing having a common axis of rotation but the interior face of the rotor chamber being eccentric to said axis, a plurality of radially yieldable blades on the rotor engaging the face of the rotor chamber, said rotor being formed with discharge ducts leading from the peripheral face thereof in advance of each of said blades and communicating each with a duct disposed parallel to the axis of the rotor and opening upon the inner face thereof, tubular open-ended valves disposed in said last-named ducts and shiftable longitudinally therein to open or close the discharge ducts, a sleeve mounted upon the rotor shaft and longitudinally shiftable thereon, said sleeve operatively engaging the tubular valves for shifting movement, and means for actuating said sleeve.

13. In a clutch, a driving and a driven element, a plurality of friction disks normally out of frictional engagement with each other, certain of the disks being operatively engaged with the driving element and certain other disks being operatively engaged with the driven element, fluid compressing means operating to connect the driving and driven elements, means for transmitting the fluid pressure to a plurality of points behind said friction disks to cause their frictional engagement, and means for relieving said fluid pressure.

14. In a clutch, a driving element, a driven element, a plurality of friction disks normally out of engagement with each other, certain of the disks being operatively connected to the driving element and certain other disks being operatively connected to the driven element, pistons disposed behind said disks, means connected with the driving and driven elements for exerting fluid pressure on said pistons to cause the engagement of said disks, and means for relieving said fluid pressure.

15. A clutch including a driving element and a driven element, spaced from each other, means for introducing fluid between the driving and driven elements, means carried by one of said elements for compressing said fluid, a plurality of friction disks normally out of engagement with each other, certain of the friction disks being operatively connected to the driving element and certain other disks being operatively connected to the driven element, pistons disposed behind said disks, means for establishing communication between the pistons and the space between the driving and driven elements, and means for disestablishing said communication and relieving the fluid pressure behind said pistons.

16. In a clutch, a driving element and a driven element, one embodying an outer casing and the other a rotor, the outer casing and the rotor having a common axis of rotation but the inner face of the outer casing being eccentric to the axis and touching the rotor at one point, the outer casing being formed with a plurality of piston cylinders and with a duct communicating with said piston cylinders and a valve chamber, a duct extending between said valve chamber and the space between the rotor and the outer casing at one side of said point of contact, pistons disposed in said cylinders, a plurality of friction disks engaged by said pistons, certain of the disks being operatively connected to the rotor and certain other disks being operatively connected to the outer casing, a valve in said valve chamber movable in one position to establish communication between the ducts and movable in another direction to close the first-named duct and open the second-named duct to the interior of the casing, means for compressing fluid between the rotor and the outer casing, and means for actuating said valve.

17. A hydraulic clutch including a driving and driven element, one embodying an outer casing and the other a rotor, the outer casing being divided by a partition into a fluid chamber and a rotor chamber within which the rotor is located, the rotor chamber having its inner face eccentric to the rotor and contacting therewith at one point, the partition being formed with an inlet port opening into the space between the rotor and the face of the rotor chamber at one side of said point of contact, whereby a fluid medium may be admitted from the fluid chamber into the rotor chamber, radially yieldable blades carried by the rotor and engaging the face of the rotor chamber, and means carried by the rotor for establishing or disestablishing communication between the spaces defined by the casing, the rotor, and the blades and said fluid chamber.

18. A hydraulic clutch including a driving element comprising an outer casing formed in two sections and an annular partition separating said sections and formed with a marginal inlet port, said partition dividing the casing into a rotor chamber and a fluid chamber, a rotor disposed in the rotor chamber and including a shaft passing through said partition and through the outer wall of the fluid chamber, said rotor and casing having a common axis of rotation but the inner face of the rotor chamber being eccentric to the rotor and touching it at one point, radially movable blades mounted on the rotor and contacting with the face of the rotor chamber, the rotor being formed with a plurality of ducts set one in advance of each blade, said ducts extending inward and being there annularly enlarged and communicating with ducts extending parallel to the axis of the rotor, tubular open-ended valves disposed in said last-named ducts and adapted to be shifted to close the discharge openings in the first-named ducts or open the same, a sliding sleeve mounted upon the rotor shaft and having a head engaging said valves to shift the same, means for actuating said sleeve, an annular flange formed upon the face of the partition and extending into the fluid chamber, cylinders formed upon the end wall of the fluid chamber, a plurality of annular friction disks bearing against the said partition and disposed within the annular flange, certain of the disks being operatively connected to said flange and certain other disks being operatively connected to the rotor, a plurality of pistons for said cylinders and bearing at one end against said friction disks, a valve chamber disposed in said fluid chamber and having on one side a pair of ports and on the other side a relief port, the wall of the outer casing being provided with a duct leading from the compression space of the rotor chamber to one of said pairs of ports and with a duct leading from the other of said pair of ports to said piston cylinders, a valve disposed within the fluid chamber and having passages adapted when the valve is in one position to establish communication between the first-named pair of ports and when in another position to cut-off the duct leading from the compression side of the rotor chamber and establish communication between the relief port and the duct leading to the piston cylinders, and means carried by the shiftable sleeve on the rotor shaft for shifting said valve into the last-named position as the sleeve is shifted outward and into the first-named position as the sleeve is moved inward.

In testimony whereof I affix my signature in presence of two witnesses.

CHARLES CLAYTON RICH. [L. S.]

Witnesses:
 CHAS. C. HOWARD,
 FREDERIC B. WRIGHT.